(12) United States Patent
Chen et al.

(10) Patent No.: US 8,634,702 B2
(45) Date of Patent: Jan. 21, 2014

(54) METHOD FOR SKIPPING MULTIMEDIA FILE AND MULTIMEDIA APPARATUS THEREOF

(75) Inventors: Liang Chen, Nanjing (CN); Jianglong Chang, Nanjing (CN); Ming Liu, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/464,637

(22) Filed: May 4, 2012

(65) Prior Publication Data

US 2012/0281966 A1 Nov. 8, 2012

(30) Foreign Application Priority Data

May 5, 2011 (CN) .......................... 2011 1 0121483
Feb. 17, 2012 (KR) ........................ 10-2012-0016446

(51) Int. Cl.
*H04N 9/80* (2006.01)
(52) U.S. Cl.
USPC ........................................................ 386/248
(58) Field of Classification Search
USPC ......... 386/201, 205, 206, 214, 217, 220, 239, 386/248, 343, 344, 350
See application file for complete search history.

(56) References Cited

U.S. PATENT DOCUMENTS

| | | | | |
|---|---|---|---|---|
| 6,792,047 B1* | 9/2004 | Bixby et al. | ............. | 375/240.26 |
| 7,031,348 B1* | 4/2006 | Gazit | ............................ | 370/504 |
| 7,711,242 B2* | 5/2010 | Im | ................................ | 386/220 |
| 2003/0123853 A1* | 7/2003 | Iwahara et al. | ................. | 386/69 |
| 2004/0184764 A1* | 9/2004 | Yagi et al. | ....................... | 386/46 |

FOREIGN PATENT DOCUMENTS

JP 200264788 A 2/2002

* cited by examiner

*Primary Examiner* — Tat Chio
(74) *Attorney, Agent, or Firm* — Sughrue Mion, PLLC

(57) ABSTRACT

A multimedia file skipping method. The skipping method adds obtained increased amount of time to a current decoding time stamp to determine a target time stamp, determines a PCR (Program Clock Reference) corresponding to the target time stamp as a PCR prediction value; determines a position offset corresponding to the PCR prediction value as a target position offset according to a linear relationship between the PCR and position offset of the multimedia file; and skips to the target position offset and plays the multimedia file from this position. By the aforementioned, it is not necessary to set a time stamp index file, and calculation is performed by utilizing the linear relationship between the PCR and the position offset, and thus the amount of calculation is reduced, time cost is reduced, and skipping speed is significantly improved.

19 Claims, 6 Drawing Sheets

METHOD FOR SKIPPING MULTIMEDIA FILE AND MULTIMEDIA APPARATUS THEREOF

CROSS-REFERENCE TO RELATED APPLICATIONS

This application claims priority from Korean Patent Application No. 2012-0016446, filed in the Korean Intellectual Property Office on Feb. 17, 2012, and Chinese Patent Application No. 201110121483.7, filed in the Chinese Intellectual Property Office on May 5, 2011, the disclosures of which are incorporated herein by reference in their entirety.

BACKGROUND

1. Field

Methods and apparatuses consistent with exemplary embodiments broadly relate to a method of skipping multimedia file and a multimedia apparatus thereof, and more particularly, to a method of skipping multimedia file during playing the multimedia file, and a multimedia apparatus thereof.

2. Description of the Related Art

According to methods in the related art, when a multimedia file is played, a quick skipping operation such as fast forward and fast rewind may be performed according to a time axis. A skipping operation according to a time axis is a process of converting an actual target time into an actual position offset of a multimedia file.

Currently, there exists a lot of multimedia file formats. Hereinbelow is an explanation on examples of quick skipping method for a file format such as MPEG-2 of a moving picture expert group (MPEG).

In a first method, when a multimedia file opens, a time-stamp index file of an entire multimedia file is set. The time-stamp index is time information of the multimedia file, and the time-stamp index and position offset information corresponds to each other. If skipping is necessary when playing the multimedia file, the time-stamp index file is searched and is positioned at a corresponding place in the multimedia file. Since this method requires setting a time-stamp index file when a multimedia file opens, the time for the multimedia file to open increases, and together with the increase of the length of the file, the time for setting the time-stamp index file increases, consequently increasing the time for the time-stamp index file to open, causing inconvenience to a user.

In a second method, when a file skipping is required, a closed circuit searching for algorithms is repeated in phases, by which a range for searching is reduced, and thus the file is positioned where it corresponds to the target time stamp. As a result of applying the aforementioned closed circuit searching algorithm, a skipping process is repeated for numerous times, the time required for each skipping increases. Also if the resolution of the multimedia file is high and the length of the multimedia file is long, the time required for skipping increases significantly, also causing inconvenience to the user.

A third method is a combination of the aforementioned two methods, where the time-stamp index file of the multimedia file is set when the multimedia file opens, and the time-stamp index file searches an interval where the target time belongs to when a skipping is required, and then the closed searching algorithm operates within that interval, and thus the file is positioned where it corresponds to the multimedia file. However, even when applying the combination processing method, the aforementioned method still has a long file opening time, long time required for each skipping, and further, if the resolution of the multimedia file is high and the file is long, there is a problem that the time required for skipping increases significantly.

Therefore, the aforementioned related art methods cause the problem of increasing the time when the multimedia file is skipped.

SUMMARY

An aspect of exemplary embodiments relates to a multimedia apparatus which can skip a multimedia file without setting a time stamp index file or performing a continuous repeated algorithm during skipping of content in the multimedia file, and a multimedia file skipping method thereof.

According to an exemplary embodiment, a method of skipping to a particular position in a multimedia file may include adding obtained increased amount of time to a current decoding time stamp; determining a target time stamp based on said adding, determining a Program Clock Reference (PCR) corresponding to the determined target time stamp and setting the determined PCR as a PCR prediction value; determining a position offset corresponding to the PCR prediction value according to a linear relationship between the PCR and position offset of the multimedia file; setting the determined position offset as a target position offset, and skipping to the target position offset in the multimedia file.

The determining the position offset may include setting an estimation section using a current position offset which is where the multimedia file is currently played; obtaining PCRs of two end points of the estimation section from the multimedia file; and determining the target position offset calculated according to a linear formula using the position offset corresponding to the PCR prediction value and the PCRs.

The linear formula may be $$pos_{target} = pos_{min} + \frac{pos_{max} - pos_{min}}{PCR_{max} - PCR_{min}} * (PCR_{input} - PCR_{min})$$

wherein the PCR_input represents the PCR prediction value, $PCR_{min}$ and $PCR_{max}$ represent PCR of the two end points, $pos_{min}$ represents a position offset of a previous end point, and $pos_{max}$ represents a position offset of a next end point, and the pos_target represents the target position offset.

The determining the position offset may further include expanding the estimation section if the PCR corresponding to the two end points of the estimation section from the multimedia file is not calculated.

The method may further include determining whether the expanded estimation section is larger than a preset section critical value; and determining the position offset after the estimation section as the target position offset if the expanded estimation section is larger than the preset section critical value.

The method may further include additionally obtaining PCRs corresponding to two end points of the expanded estimation section from the multimedia file if the expanded estimation section is same or smaller than a preset section critical value; and calculating the position offset corresponding to the PCR prediction value according to the linear formula in the multimedia file and determining the target position offset using the additionally obtained PCRs.

The determining the position offset may further include obtaining the PCR corresponding to the target position offset from the multimedia file, and setting the obtained PCR as an actual PCR value; and determining whether an absolute value of a difference of the PCR prediction value and the actual PCR value is bigger than the preset estimation critical value, and wherein the multimedia file skips to the target position offset and plays from the skipped location if the absolute value of the difference is not larger than the preset estimation critical value.

The determining the position offset may further include determining the position offset after the estimation section as the target position offset if the absolute value of the different is bigger than the preset estimation critical value.

According to yet another exemplary embodiment, a multimedia apparatus may include a PCR prediction value determining unit which adds obtained increased amount of time to a current decoding time stamp, which determines a target time stamp and determines a Program Clock Reference (PCR) corresponding to the target time stamp, and sets the determined PCR as a PCR prediction value; a target position offset determining unit which determines a position offset corresponding to the PCR prediction value according to a linear relationship between the PCR and position offset of the multimedia file and which sets the determined position offset as a target position offset; and a playing unit which skips to the target position offset in a multimedia file.

The target position offset determining unit may set an estimation section using a current position offset which is where the multimedia file is currently played by the playing unit; obtain PCRs of two end points of the estimation section from the multimedia file; and determines the target position offset calculated according to a linear formula using the position offset corresponding to the PCR prediction value and the PCRs.

The linear formula may be $$pos_{target} = pos_{min} + \frac{pos_{max} - pos_{min}}{PCR_{max} - PCR_{min}} * (PCR_{input} - PCR_{min})$$

wherein the PCR_input represents the PCR prediction value, $PCR_{min}$ and $PCR_{max}$ represent PCR of the two end points, $pos_{min}$ represents a position offset of a previous end point, and $pos_{max}$ represents a position offset of a next end point, and the pos_target represents the target position offset.

The target position offset determining unit may expand the estimation section if the PCR corresponding to the two end points of the estimation section from the multimedia file is not calculated.

The target position offset determining unit may determine whether the expanded estimation section is larger than a preset section critical value; and determines the position offset after the estimation section as the target position offset if the expanded estimation section is larger than the preset section critical value.

The target position offset determining unit may additionally obtain PCRs corresponding to two end points of the expanded estimation section from the multimedia if the expanded estimation section is same or smaller than the preset section critical value, and calculate the position offset corresponding to the PCR prediction value according to the linear formula in the multimedia file and determine the target position offset using the additionally obtained PCRs.

The target position offset determining unit may obtain the PCR corresponding to the target position offset from the multimedia file, and set the obtained PCR as an actual PCR value; and determine whether an absolute value of a difference of the PCR prediction value and the actual PCR value is larger than the preset estimation critical value.

The playing unit may skip to and play the target position offset if the absolute value of the difference is not larger than the preset estimation critical value.

The target position offset determining unit may determine the position offset after the estimation section as the target position offset if the absolute value of the difference is larger than the preset estimation critical value.

According to various exemplary embodiments, setting the time stamp index file is not necessary, the calculation is performed utilizing the linear relationship between the PCR and position offset, and thus the amount of calculation is reduced, time cost is reduced, and skipping speed is significantly improved.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
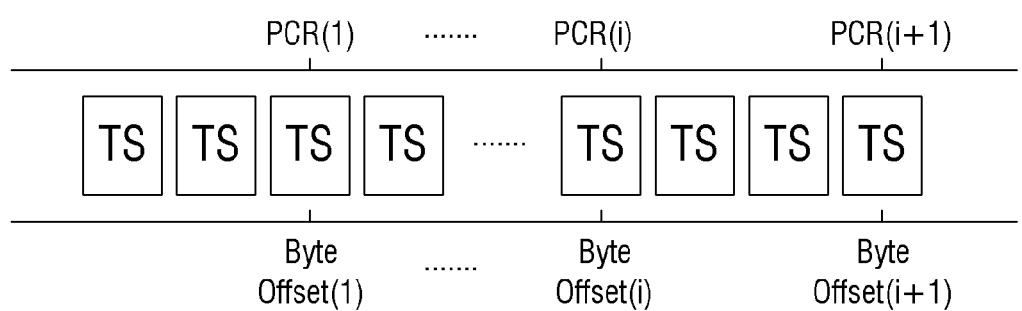
FIG. 1 is a view illustrating a linear relationship between PCRs of a multimedia file and position offsets according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Although a few embodiments have been shown and described, it would be appreciated by those skilled in the art that changes may be made in this exemplary embodiment without departing from the principles and spirit of the invention, the scope of which is defined in the claims and their equivalents.

Hereinbelow is a detailed explanation of exemplary embodiments with reference to the figures. In exemplary embodiments, a decoding time stamp for determining a corresponding position offset is not used. Instead, in order to skip a time position offset during playing, the decoding time stamp is converted into a program clock reference (PCR), and a linear relationship between PCRs of a multimedia file and position offsets is used to determine a target position offset.

The linear relationship among a PCR of a multimedia file, PCRs, and position offsets is explained hereinbelow.

In a related art digital television system, for synchronization, a transmitting end transmits a sample of a system block (27 MHz) to a receiving end at least every 100 msec. The sample of the system block is used as a clock reference signal for decoding that is a PCR. PCR information is stored in a multimedia transmission stream (TS) packet, and after a decoding end (that is, the receiving end) reads the sample, the PCR information is used to show a state of a local clock.

The relationship between PCRs and position offsets in a multimedia file can be regarded as a partial linear relationship. As illustrated in FIG. 1, in each interval, the PCR values and position offsets have a linear relationship of offset(i+1)−offset(i)=k*(PCR(i+1)−PCR(i)), where, in a multimedia file, offset 1+1 and offset i represent a position offset of position i+1 and position offset of position i, respectively; PCR i+1 and PCR i represent PCR of position i+1 and PCR of position i, respectively; and K represents a linear relationship coefficient.

Considering that there is a linear relationship between the PCRs and position offsets in the multimedia file, when the decoding time stamp is converted into a PCR, a position offset corresponding to the multimedia file can be easily calculated according to the PCR. As aforementioned, PCR relates to a digital television system. In fact, not only a digital television but also several players may play multimedia files which include PCRs. Therefore, the skipping method to be explained hereinbelow is not merely limited to a digital television but can be applied to all multimedia files which include PCRs.

Figure 2:
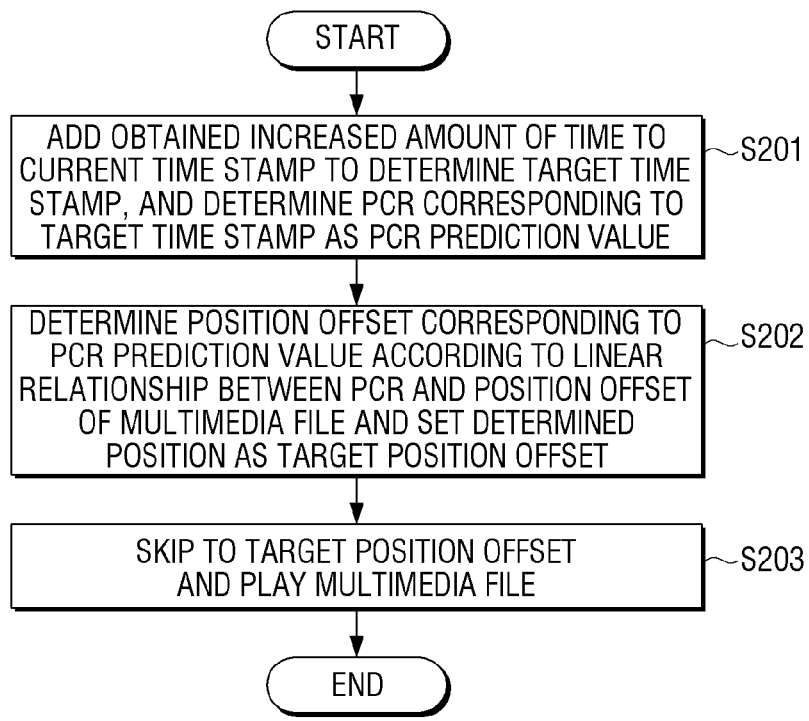
FIG. 2 is a flowchart illustrating a skipping method of a multimedia file, according to an exemplary embodiment.

As aforementioned, a skipping method of a multimedia file according to an exemplary embodiment is provided as illustrated in FIG. 2. The method includes the process hereinbelow.

In operation S201, an increased obtained amount of time is added to a current decoding time stamp to determine it as a target time stamp, and a PCR corresponding to the target time stamp is determined as a PCR prediction value.

In operation S202, a position offset of a multimedia file corresponding to the PCR prediction value is determined, according to a linear relationship between PCRs and position offsets of the multimedia file, and the determined position offset is set as a target position offset for skipping.

The exemplary operation 202 may include the following specific processes:

In operation B1, an estimation section[pos_minimum, pos_maximum] is set as a center of the estimation section, by a current position offset played by the multimedia file. pos_minimum is a position offset of a previous end point, and pos_maximum is a position offset of a next end point.

In operation B2, PCRs corresponding to two end points of each estimation section of the multimedia file is obtained. PCR_minimum is PCR corresponding to pos_minimum, and PCR maximum is PCR corresponding to pos_maximum.

In operation B3, a position offset corresponding to the PCR prediction value is calculated by a linear formula, in the multimedia file.

In the linear formula $$pos_{target} = pos_{min} + \frac{pos_{max} - pos_{min}}{PCR_{max} - PCR_{min}} * (PCR_{input} - PCR_{min})$$ [Mathematical formula 1]

PCR input represents the PCR prediction value, while the pos target represents the target position offset.

In operation 203, the multimedia file is skipped by the target position offset and then is played at this location.

In other words, in an exemplary embodiment, a certain increased amount of time is added to the current decoding time stamp, and the target time stamp for skipping is obtained. The increased amount of time may be a preset value such as 10 seconds or a value set by a user. Meanwhile, after obtaining the target time stamp, an exemplary method converts the target time stamp into the corresponding PCR, that is the PCR prediction value. Since the conversion relationship between a decoding time stamp and a PCR is known in the related art, it can easily be obtained. An exemplary embodiment will be explained in more detail hereinafter with reference to FIGS. 3 to 5. Consequently, the exemplary method utilizes the linear relationship between the PCRs and position offsets of the multimedia file in determining the position offset of the multimedia file corresponding to the PCR prediction value, and then performs a skipping.

The aforementioned exemplary operations B1~B3 explain how to determine the target position offset according to the linear relationship. If the linear relationship between the PCRs and position offsets of the multimedia file is known, the present skipping method may not be limited to operations B1~B3 and may skip the multimedia file by other methods as well.

Hereinbelow is a more detailed explanation of the file skipping method of a multimedia file according to an exemplary embodiment.

In an exemplary embodiment, it is assumed that a multimedia file is a MPEG-2 format (such as MPEG-2 TS) file, and that it requires skipping in some part of time during decoding and playing. In addition, in an exemplary embodiment, a current playing position offset is shown in byte unit of pos_curr, while a length of a multimedia file is shown in byte unit of file_len, and a total playing time of the multimedia file is shown in a millisecond unit of total_duration.

In an exemplary embodiment, it is assumed that an estimation critical value PCR_effective range is preset in order to determine whether or not a linear estimation is exact, and a section critical value POS_effective range is set in order to limit a size of the estimation section.

Figure 3:
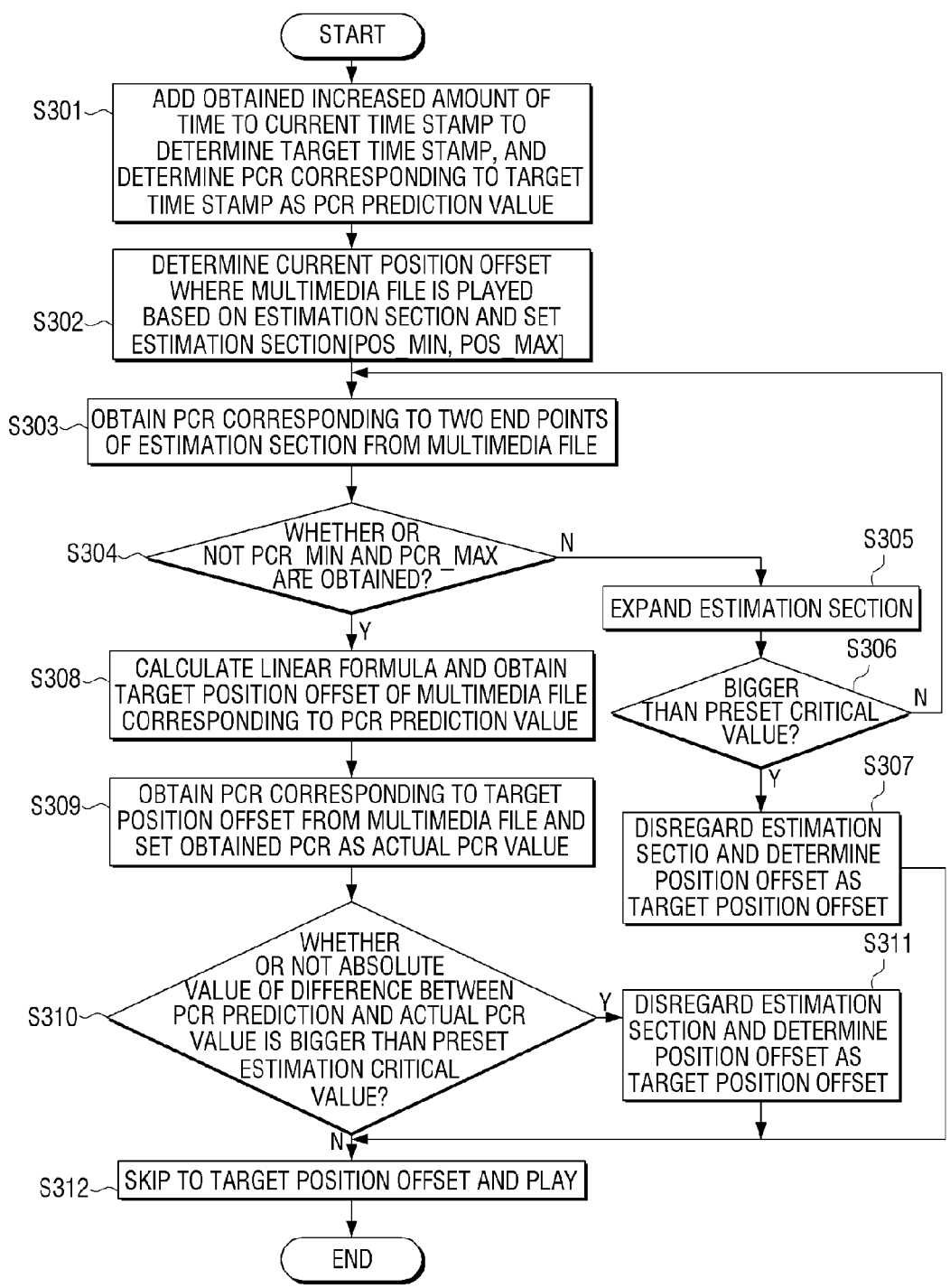
FIG. 3 is a flowchart illustrating a skipping method of a multimedia file, according to an exemplary embodiment.

FIG. 3 is a flowchart illustrating a skipping method of a multimedia file, according to an exemplary embodiment.

In operation S301, the current decoding time stamp is added to the obtained increased amount of time to determine the target time stamp for skipping, and the PCR corresponding to the target time stamp is determined as the PCR prediction value.

As aforementioned, according to the conversion relationship between the decoding time stamp and the PCR in related methods, $$PCR_{input} = \frac{target_{DTS}}{1000} * 27000000$$ [Mathematical formula 2]

PCR_input is the PCR prediction value, target_DTS is the target time stamp (unit is msec.), and 27000000 is the sample frequency of the system block. According to the related art relationship in mathematical formula 2, the target time stamp based on DTS may be converted into a time based on PCR.

In operation S302, an estimation section[pos_minimum, pos_maximum] is set as a center of the estimation section, by a current position offset played by the multimedia file.

pos_minimum is a position offset of a previous end point, and pos_maximum is a position offset of a next end point.

The position offset of the previous end point is pos_minimum=pos_current−a*(file_len), while the position offset of the next end point is pos_maximum=pos_current+a*(file_len). Herein, a is an adjustment coefficient having a range from 0 to 1, and file_len is the length of the multimedia file. Value a may be determined in consideration of the actual state or experience such as a=2*1000/total_duration. Herein, 2 is an experience value having units of seconds, and total_duration is the total playing time of the multimedia file having units of msec.

Meanwhile, besides the aforementioned exemplary embodiments, other methods for determining an estimation section may be applied.

In operation S303, the PCRs corresponding to the two end points of each estimation section from the multimedia file are obtained. PCR_minimum is PCR corresponding to pos_minimum, and PCR_maximum is PCR corresponding to pos_maximum.

Herein, synchronization head of the multimedia file TS packet may be searched in turn starting from the position offset pos_minimum, and then TS packet of 188 byte is read, and then PCR of the TS packet is read from an adaption field of the packetized TS. Herein, the PCR is the corresponding PCR_minimum. In a similar method, PCR_maximum may be obtained as well.

In operation S304, whether or not PCR_maximum and PCR_minimum have been obtained is determined. If the PCR_maximum and PCR_minimum have been obtained, operation S308 is performed, and if not, operation 305 is performed.

In operation S305, the estimation section is expanded.

That is because, since the PCR is stored in the TS packet having sections, if the estimation section is matched inadequately (with a section that is too small), the corresponding PCRs make it impossible to obtain the end points of the estimation section. Therefore, it is necessary to expand the estimation section.

When expanding the estimation section, adjustment coefficient "a" in operation S302 may be increased, for instance, a=2*1000/total_duration, "a" value may become twice as a=4*1000/total_duration. Herein, the method of adjusting "a" may be determined by the user.

In operation S306, whether or not the expanded estimation section is bigger than the preset section critical value POS_effective_range is determined. If the expanded estimation section is not bigger than the preset section critical value POS_effective_range, the method returns to operation S303, and if not, performs operation S307.

The linear relationship between the PCRs and position offsets of the multimedia file is not ideal, but rather, a rough linear relationship that exists locally. As such, if the estimation section is set to be too big, a linear relationship may not exist, and estimating a position offset may not be accurately performed. For this reason, in an exemplary embodiment, the section critical value POS_effective_range is assumed and adjusted as follows:

$$POS_{effective\ range} = \frac{15*1000}{total_{duration}} * file_{len} \quad \text{[Mathematical formula 3]}$$

file_len is a length of the multimedia file in byte units, total_duration is a total playing time of the multimedia file in msec units, and 15 is a value set based on experience of units of seconds. In general, the section critical value is related to the total playing time and file length of the multimedia. Herein, the method for adjusting the section critical value may be determined by the user.

In operation S307, the target position offset for skipping the position offset after the estimation section is determined, and then operation S312 is performed.

In an exemplary embodiment, if the PCR_minimum and PCR_maximum cannot be obtained even after the estimate section is sufficiently expanded, the PCR may not have been transmitted or the PCR may have been missed. In this case, the estimation section may be disregarded.

In operation S308, the target position offset of the multimedia file corresponding to the PCR estimation value is obtained after calculating the linear formula. The linear formula may be as follows:

$$pos_{target} = pos_{min} + \frac{pos_{max} - pos_{min}}{PCR_{max} - PCR_{min}} * (PCR_{input} - PCR_{min}) \quad \text{[Mathematical formula 4]}$$

Herein, the PCR_input represents the PCR estimation value, while pos_target represents the target position offset.

In an exemplary embodiment, the pos_maximum, pos_minimum, PCR_maximum, PCR_minimum and PCR_input are used to construct a local linear relationship. Other methods may be used to construct the linear relationship.

In operation S309, the PCR corresponding to the target position offset from the multimedia file is obtained, where the obtained PCR is set as the actual PCR value.

Herein, an exemplary method for obtaining the PCR may be similar to the one used in operation S303 to obtain PCRs of the two end points. That is, the synchronization head of the multimedia file TS packet may be searched in turn starting from the target position offset, and then the TS packet of 188 byte is read, and then the PCR of the TS packet is read from the adaption field of the packeted TS. Herein, the calculated PCR is the actual PCR value.

In operation S310, whether or not the absolute difference of the PCR estimation value and the actual PCR value is bigger than the preset estimation critical value is determined, and thus if the absolute value of the difference between the PCR prediction value and the actual PCR value is not bigger than the preset estimation critical value, operation 312 is performed in which the file is played from the target position offset, and if not, operation 311 is performed in which the estimation section is disregarded and the position offset is determined without the estimation section as described above.

In an exemplary embodiment, the estimation critical value may be set to determine whether or not the linear estimation is exact, and the estimation critical value may be set according to the actual state or experience. For example, the estimation critical value may be adjusted as follows:

$$PCR_{effective\ range} = \frac{1024*1024}{file_{len}} * \frac{total_{duration}*27000000}{1000} \quad \text{[Mathematical formula 5]}$$

Herein, the PCR_effective range is the estimation critical value, file_len is the length of the multimedia file of byte unit, total_duration is the total playing time of the multimedia file of milsec units, and 1024*1024 represents 1M adjusted based on the experience. In general, setting of the estimation critical value is related to the length of the multimedia file, total playing time of the multimedia file, and code rate. According to an exemplary embodiment, the method for setting the estimation critical value may be adjusted by the user using the present disclosure.

As noted above, in operation S311, the target position offset for skipping the position offset after the estimation section is determined, and then operation S312 is performed.

Figure 4:
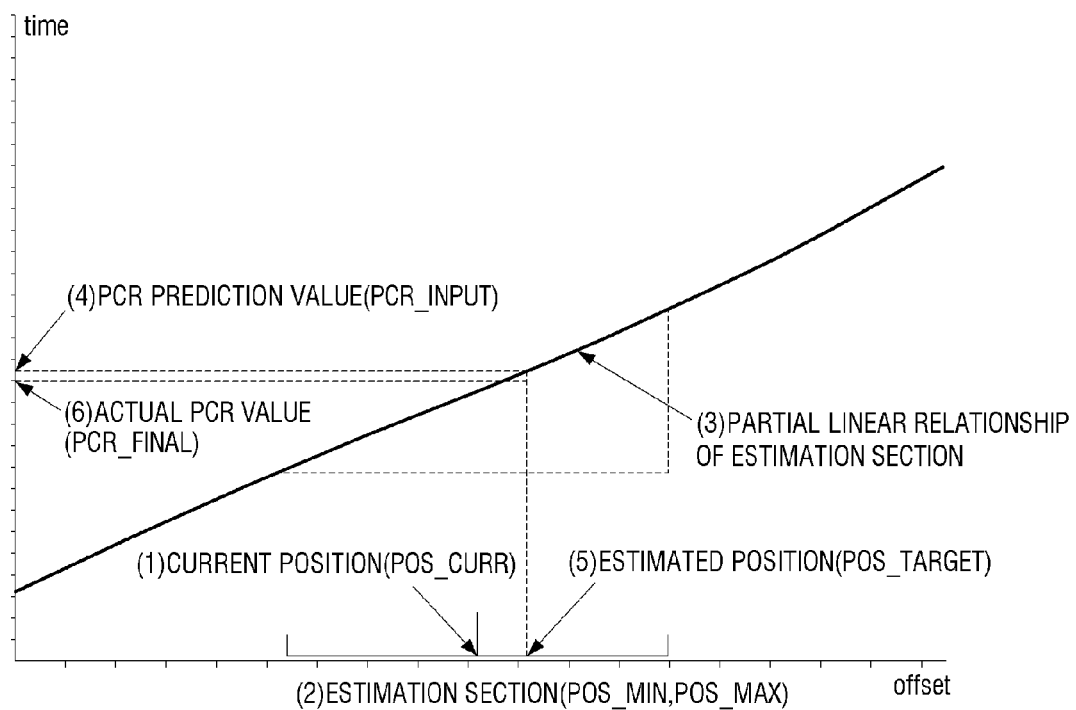
FIG. 4 is a graph illustrating a method of determining a position offset, when an absolute value between a PCR prediction and an actual PCR does not exceed an estimation threshold according to an exemplary embodiment.
Figure 5:
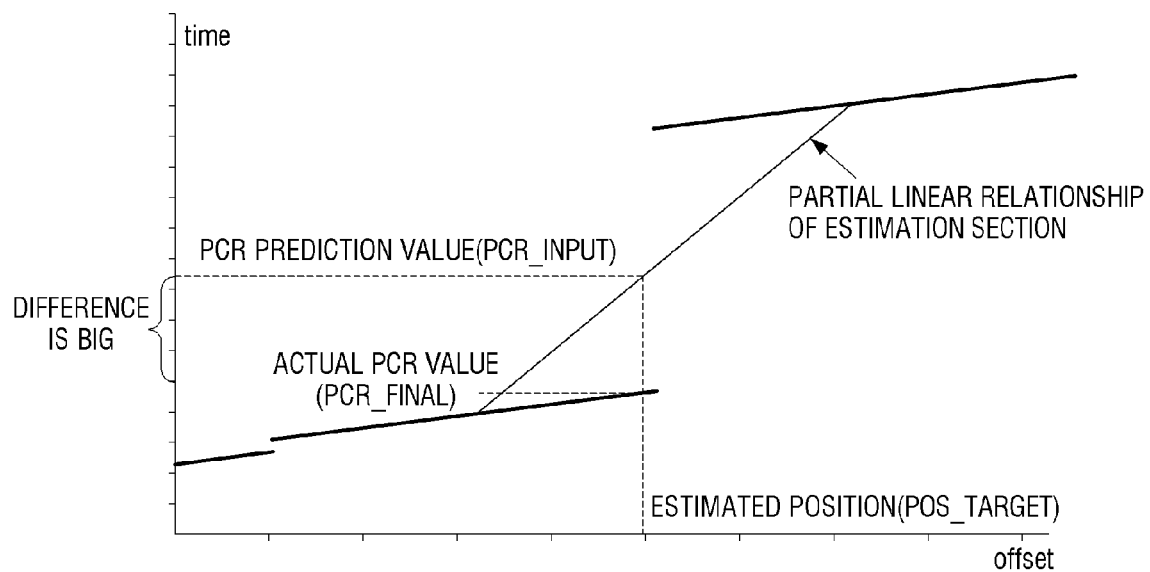
FIG. 5 is a illustrating a method of determining a position offset, when an absolute value between a PCR prediction and an actual PCR exceeds an estimation threshold according to an exemplary embodiment.

If the absolute value of the difference between the PCR estimation value and the actual PCR value is smaller than the estimation critical value, it means that this area has a linear relationship, and as illustrated in FIG. 4, the estimation is relatively exact. If the absolute value of the difference between the PCR prediction value and the actual PCR value is bigger than the estimation critical value, as illustrated in FIG. 5, a split joint etc. may be generated due to discontinuous PCR, during the manufacturing process of the multimedia file. As illustrated in FIG. 5, the linear relationship between the first and second section is not continuous, and thus instead, break-off scenarios exists in the linear relationship of them belonging to the section linear relationship. Therefore, the difference between the PCR prediction value and the actual PCR value increases. In such a case, in order to prevent an infinite loop and to guarantee continuity of skipping, the estimation section according to the exemplary embodiment can be directly disregarded.

In operation S312, the multimedia file is skipped to a target offset position and the multimedia file is played from the target position offset.

In an exemplary embodiment, in order to construct a linear relationship between the PCRs and position offsets of the multimedia file, the estimation section[pos_minimum, pos_maximum] may be set. In an exemplary embodiment, if the linear relationship is constructed to utilize another method, the estimation section[pos_minimum, pos_maximum] may not be adjusted. In an exemplary embodiment, in order to prevent an excessive estimation section and to guarantee the precision of estimation, the section critical value is set, and an appropriate estimation section is adjusted to apply methods of operations & 304~306. If the precision of the estimation is excluded from an exemplary embodiment, the aforementioned method cannot be applied, and instead, a fixed estimation section will be applied. That is, operation 304~306 are not performed and may be omitted. Similarly, in order to guarantee precision of estimation, in an exemplary embodiment, the estimation critical value is set, the actual PCR applying operations 309~311 is calculated, the difference between the actual PCR value and the PCR prediction value is compared, and then it is determined whether or not that difference exceeds the estimation critical value. If the estimation exactness is not considered further in an exemplary embodiment, the aforementioned method may not be applied, that is, operations 309~311 may not necessarily be performed and may be omitted.

Since in an exemplary embodiment, the decoding time stamp is converted into PCRs first, the target position offset is determined according to the linear relationship between the PCRs and position offsets of the multimedia file, and at the same time, estimation section, section critical value, estimation critical value are sufficiently used to guarantee the exactness of the estimation. Therefore, on the one hand, since it is not necessary to set the time stamp index in an exemplary embodiment, the time for opening the multimedia file need not be increased. On the other hand, due to the linear relationship between the PCRs and position offsets of the multi-media file, the calculated volume is small, and the time cost is reduced, significantly improving the skipping speed and obtaining an excellent user environment.

Figure 6:
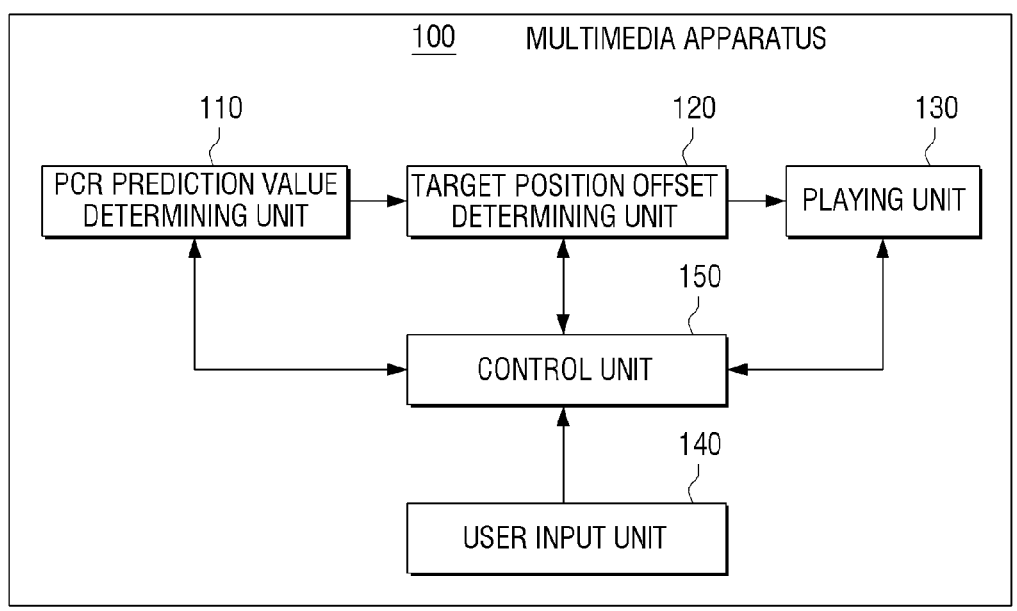
FIG. 6 is a block diagram illustrating a configuration of a multimedia apparatus, according to an exemplary embodiment.

Hereinbelow is a detailed explanation of the multimedia apparatus 100 according to an exemplary embodiment, with reference to FIG. 6. As illustrated in FIG. 6, the multimedia apparatus 100 includes a PCR prediction value determining unit 110, a target position offset determining unit 120, a playing unit 130, a user input unit 140, and a control unit 150. Especially, the multimedia apparatus 100 according to an exemplary embodiment may be a TV, desktop PC, notebook PC, tablet PC, PMP, mobile phone, and electronic frame, but this is merely an exemplary embodiment, and thus the multimedia apparatus 100 may be another apparatus that may play a multimedia file. A multimedia apparatus 100 may include a processor performing exemplary calculations, a memory storing the multimedia files and other data such as position offset, a screen which plays the multimedia file and an interface that transmits and receives data from the user.

The PCR prediction value determining unit 110 determines the target time stamp by adding the increased amount of time obtained to the current decoding time stamp, and determines the PCR (Program Clock Reference) corresponding to the target time stamp as the PCR prediction value. Herein, exemplary conversion relationship between the decoding time stamp and the PCR is provided in an exemplary mathematical formula 2.

The target position offset determining unit 120 determines the position offset corresponding to the PCR prediction value as the target position offset according to the linear relationship between the PCR and position offset of the multimedia file. Herein, the detailed exemplary method of determining the target position offset is explained in FIGS. 2 to 5, and thus the detailed explanation is omitted.

The playing unit 130 plays the multimedia file by skipping to the target position offset determined by the target position offset determining unit 120.

The user input unit 140 receives a command from the user for controlling the multimedia apparatus 100. Especially, the user input unit 140 receives a command from the user regarding a skipping operation such as fast forward or rewind of the multimedia file.

The control unit 150 controls the overall operations of the multimedia apparatus 100 according to the user's command input by the user input unit 140. Especially, the control unit 150 controls the PCR prediction value determining unit 110, the target position offset determining unit 120 and the playing unit 130 according to the command regarding the skipping operation of the multimedia file input by the user input unit 140.

Although a few exemplary embodiments have been shown and described, it would be appreciated by those skilled in the art that changes may be made in exemplary embodiments without departing from the principles and spirit of an inventive concept, the scope of which is defined in the claims and their equivalents. It is understood that all possible changes and/or modifications in form and details may be made therein without departing from the spirit and scope of an inventive concept as defined by the appended claims and their equivalents. The exemplary embodiments can be readily applied to various apparatuses that play multimedia files. The scope is defined not by the detailed description of exemplary embodiments but by the appended claims, and their equivalents and all differences within the scope will be construed as being included in an inventive concept.

What is claimed is:

1. A method of skipping to a particular position in a multimedia file, the method comprising:
   adding obtained increased amount of time to a current decoding time stamp;
   determining a target time stamp based on said adding, and determining a Program Clock Reference (PCR) corresponding to the determined target time stamp and setting the determined PCR as a PCR prediction value;
   determining a position offset corresponding to the PCR prediction value according to a linear relationship between the PCR and position offset of a multimedia file;
   setting the determined position offset as a target position offset; and
   skipping to the target position offset in the multimedia file,
   wherein the determining the position offset comprises setting an estimation section using a current position offset which is where the multimedia file is currently played, the current position offset is at a center of the estimation section.

2. The method according to claim 1, wherein the determining the position offset comprises:
   obtaining PCRs of two end points of the estimation section from the multimedia file; and
   determining the target position offset calculated according to a linear formula using the position offset corresponding to the PCR prediction value and the PCRs.

3. The method according to claim 2, wherein the linear formula is $$pos_{target} = pos_{min} + \frac{pos_{max} - pos_{min}}{PCR_{max} - PCR_{min}} * (PCR_{input} - PCR_{min})$$

and wherein the $PCR_{input}$ represents the PCR prediction value, $PCR_{min}$ and $PCR_{max}$ represent PCR of the two end points, $pos_{min}$ represents a position offset of a previous end point, and $pos_{max}$ represents a position offset of a next end point, and the pos_target represents the target position offset.

4. The method according to claim 2, wherein the determining the position offset further comprises expanding the estimation section if the PCR corresponding to the two end points of the estimation section from the multimedia file is not calculated.

5. The method according to claim 4, further comprising:
   determining whether the expanded estimation section is larger than a preset section critical value; and
   determining the position offset after the estimation section as the target position offset if the expanded estimation section is larger than the preset section critical value.

6. The method according to claim 5, further comprising:
   additionally obtaining PCRs corresponding to two end points of the expanded estimation section from the multimedia file if the expanded estimation section is same or smaller than the preset section critical value; and
   calculating the position offset corresponding to the PCR prediction value according to the linear formula in the multimedia file and determining the target position offset using the additionally obtained PCRs.

7. The method according to claim 2, wherein the determining the position offset comprises:
   obtaining the PCR corresponding to the target position offset from the multimedia file, and setting the obtained PCR as an actual PCR value; and
   determining whether an absolute value of a difference of the PCR prediction value and the actual PCR value is bigger than a preset estimation critical value, and
   wherein the multimedia file skips to the target position offset and plays from the skipped location if the absolute value of the difference is not bigger than the preset estimation critical value.

8. The method according to claim 7, wherein the determining the position offset further comprises determining the position offset after the estimation section as the target position offset if the absolute value of the difference is bigger than the preset estimation critical value.

9. The method according to claim 2, wherein the setting the estimation section comprises calculating the estimation section based on total playing time of the multimedia file and based on total length of the multimedia file.

10. The method according to claim 2, wherein if the linear relationship between the PCR and the position offset of the multimedia file is not continuous, determining the target position offset without an estimation section.

11. A multimedia apparatus comprising:
    a PCR prediction value determining unit which adds obtained increased amount of time to a current decoding time stamp, which determines a target time stamp based on the adding, and which determines a Program Clock Reference (PCR) corresponding to the determined target time stamp, and sets the determined PCR as a PCR prediction value;
    a target position offset determining unit which determines a position offset corresponding to the PCR prediction value according to a linear relationship between the PCR and position offset of a multimedia file and which sets the determined position offset as a target position offset; and
    a playing unit which skips to the target position offset in the multimedia file,
    wherein the target position offset determining unit sets an estimation section using a current position offset which is where the multimedia file is currently played, the current position offset is at a center of the estimation section.

12. The apparatus according to claim 11, wherein the target position offset determining unit obtains PCRs of two end points of the estimation section from the multimedia file; and determines the target position offset calculated according to a linear formula using the position offset corresponding to the PCR prediction value and the PCRs.

13. The apparatus according to claim 12, wherein the linear formula is $$pos_{target} = pos_{min} + \frac{pos_{max} - pos_{min}}{PCR_{max} - PCR_{min}} * (PCR_{input} - PCR_{min})$$

and wherein the PCR_input represents the PCR prediction value, $PCR_{min}$ and $PCR_{max}$ represent PCR of the two end points, $pos_{min}$ represents a position offset of a previous end point, and $pos_{max}$ represents a position offset of a next end point, and the pos_target represents the target position offset.

14. The apparatus according to claim 12, wherein the target position offset determining unit expands the estimation section if the PCR corresponding to the two end points of the estimation section from the multimedia file is not calculated.

15. The apparatus according to claim 14, wherein the target position offset determining unit determines whether the expanded estimation section is larger than a preset section critical value and determines the position offset after the estimation section as the target position offset if the expanded estimation section is larger than the preset section critical value.

16. The apparatus according to claim 15, wherein the target position offset determining unit additionally obtains PCRs corresponding to two end points of the expanded estimation section from the multimedia file if the expanded estimation section is same or smaller than the preset section critical value, and calculates the position offset corresponding to the PCR prediction value according to the linear formula in the multimedia file and determines the target position offset using the additionally obtained PCRs.

17. The apparatus according to claim 12, wherein the target position offset determining unit obtains the PCR corresponding to the target position offset from the multimedia file, and sets the obtained PCR as an actual PCR value; and determines whether an absolute value of a difference of the PCR prediction value and the actual PCR value is larger than a preset estimation critical value, and wherein the playing unit skips to and plays the target position offset if the absolute value of the difference is not larger than the preset estimation critical value.

18. The apparatus according to claim 17, wherein the target position offset determining unit determines the position offset after the estimation section as the target position offset if the absolute value of the difference is larger than the preset estimation critical value.

19. A non-transitory computer readable medium for executing a method of skipping to a particular position in a multimedia file, the method comprising:

adding obtained increased amount of time to a current decoding time stamp;

determining a target time stamp based on said adding, and determining a Program Clock Reference (PCR) corresponding to the determined target time stamp and setting the determined PCR as a PCR prediction value;

determining a position offset corresponding to the PCR prediction value according to a linear relationship between the PCR and position offset of a multimedia file;

setting the determined position offset as a target position offset; and skipping to the target position offset in the multimedia file, wherein the determining the position offset comprising setting an estimation section using a current offset which is where the multimedia file currently played, the current position offset is at a center of the estimation section.

* * * * *